(12) United States Patent
Mizuno et al.

(10) Patent No.: US 11,421,998 B2
(45) Date of Patent: Aug. 23, 2022

(54) RIDE-SHARING MEDIATING SYSTEM, SERVER, PROGRAM, AND RIDE-SHARING MEDIATING METHOD

(71) Applicant: TOYOTA JIDOSHA KABUSHIKI KAISHA, Toyota (JP)

(72) Inventors: Yuko Mizuno, Nagoya (JP); Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 346 days.

(21) Appl. No.: 16/587,114

(22) Filed: Sep. 30, 2019

(65) Prior Publication Data
US 2020/0141742 A1 May 7, 2020

(30) Foreign Application Priority Data
Nov. 1, 2018 (JP) .............................. JP2018-206807

(51) Int. Cl.
*G01C 21/34* (2006.01)
*G01C 21/36* (2006.01)
*G06Q 10/02* (2012.01)

(52) U.S. Cl.
CPC ..... *G01C 21/3453* (2013.01); *G01C 21/3664* (2013.01); *G01C 21/3667* (2013.01); *G06Q 10/02* (2013.01)

(58) Field of Classification Search
CPC . G06F 3/00; G06F 3/04; G06F 3/0484; G01C 21/00; G01C 21/3461; G01C 21/3697; G01C 21/12; G01C 21/20; G01C 21/26; G01C 21/265; G01C 21/34; G01C 21/3484; G01C 21/3415; G01C 21/3469; G01C 21/36; G01C 21/3611; G01C 21/3632; G01C 21/3664; G01C 21/367; G01C 21/3673; G01C 21/3679; G01C 21/3667; G01C 21/3453; G06Q 10/00;
(Continued)

(56) References Cited

U.S. PATENT DOCUMENTS

| | | | |
|---|---|---|---|
| 9,261,374 B2 * | 2/2016 | Mundinger | ............ G06Q 40/08 |
| 2007/0276595 A1 * | 11/2007 | Lewinson | .......... G01C 21/3484 |
| | | | 701/533 |
| 2018/0275648 A1 | 9/2018 | Ramalingam | |

FOREIGN PATENT DOCUMENTS

| JP | 2014-191578 A | 10/2014 |
|---|---|---|
| JP | 2018-055538 A | 4/2018 |

* cited by examiner

*Primary Examiner* — Anthony R Jimenez
(74) *Attorney, Agent, or Firm* — Oblon, McClelland, Maier & Neustadt, L.L.P.

(57) ABSTRACT

A ride-sharing mediating system includes a driver terminal, a user terminal, and a server. The driver terminal receives input of planned travel information and transmits it to the server. The user terminal receives input of ride-sharing request information and transmits it to the server. The server includes a reception portion, a server controlling portion, a transmission portion, and a storage portion. The server controlling portion searches pieces of planned travel information stored in the storage portion based on the ride-sharing request information and determines a proposal route including one or more routes in which a user shares a ride in a registered vehicle from a departure point to a destination. The server controlling portion determines the proposal route by comparing, with each other, a plurality of routes including a route in which the user changes at least two registered vehicles.

16 Claims, 13 Drawing Sheets

(58) Field of Classification Search
CPC ... G06Q 10/04; G06Q 10/02; B60W 2550/00; B60W 2550/12; B60W 2550/14; B60W 2550/20; B60W 2550/22; B60W 2550/40; B60W 2550/402; B60W 2550/406
USPC .......................................................... 701/425
See application file for complete search history.

RIDE-SHARING MEDIATING SYSTEM, SERVER, PROGRAM, AND RIDE-SHARING MEDIATING METHOD

INCORPORATION BY REFERENCE

The disclosure of Japanese Patent Application No. 2018-206807 filed on Nov. 1, 2018 including the specification, drawings and abstract is incorporated herein by reference in its entirety.

BACKGROUND

1. Technical Field

The disclosure relates to a ride-sharing mediating system, a server, a program, and a ride-sharing mediating method.

2. Description of Related Art

In the related art, there has been known a system that mediates a ride-sharing service between a driver of a vehicle and a user who wants to share a ride. For example, in Japanese Unexamined Patent Application Publication No. 2018-55538 (JP 2018-55538 A), a server that mediates a ride-sharing service acquires pieces of information on planned routes of vehicles from a plurality of in-vehicle terminals and provides the pieces of information to a user. The user can search the pieces of information on the planned routes on a portable terminal. The user searches for a vehicle by setting, as a search condition, a condition that desired "getting-in and getting-off points" are included in information on a planned route and selects a desired vehicle for ride-sharing from displayed vehicle list information, so that the user can apply for ride-sharing.

SUMMARY

In the related art, when a desired departure point and a desired destination of the user of the ride-sharing service are included in a side-trip allowable range of a planned route of at least any of vehicles registered in the server, matching of a ride-sharing condition can be established. When there is no such planned route, the user cannot share a ride. It is also conceivable that the server mediates the ride-sharing service so that the user is permitted to get in and get off a vehicle at positions deviating from a planned route of the vehicle. However, in that case, a driver and a fellow occupant in the vehicle are forced to make a detour. This decreases a convenience for the driver and the fellow occupant in the vehicle.

The disclosure is accomplished in view of the above problems, and an object of the disclosure is to provide a ride-sharing mediating system, a server, a program, and a ride-sharing mediating method each for raising usability of a ride-sharing service for a user without decreasing a convenience for a driver and a fellow occupant in a vehicle.

A ride-sharing mediating system according to one aspect of the disclosure to achieve the above object is a ride-sharing mediating system including a driver terminal, a user terminal, and a server. The driver terminal is configured to receive, from registered vehicles, input of pieces of planned travel information including information on a planned travel route and a travel estimated time. The user terminal is configured to receive input of ride-sharing request information including a departure point, a destination, and at least either of a desired departure time and a desired arrival time. The server includes: a reception portion configured to receive the planned travel information from the driver terminal and receive the ride-sharing request information from the user terminal, a storage portion in which the pieces of planned travel information of the registered vehicles are stored, a controlling portion configured to search the pieces of planned travel information stored in the storage portion based on the ride-sharing request information and determine a proposal route including one or more routes in which a user shares a ride in any of the registered vehicles from the departure point to the destination, and a transmission portion configured to transmit the proposal route to the user terminal. The controlling portion determines the proposal route by comparing, with each other, a plurality of routes including a route in which the user changes at least two registered vehicles.

A server according to one aspect of the disclosure to achieve the above object is a server including a reception portion, a storage portion, a controlling portion, and a transmission portion. The reception portion is configured to receive planned travel information from a driver terminal and receive ride-sharing request information from a user terminal, the planned travel information including information on a planned travel route and a travel estimated time of a registered vehicle, the ride-sharing request information including a departure point and a destination of a user who requests ride-sharing and at least either of a desired departure time and a desired arrival time. In the storage portion, pieces of planned travel information of registered vehicles are stored. The controlling portion is configured to search the pieces of planned travel information stored in the storage portion based on the ride-sharing request information and determine a proposal route including one or more routes in which the user shares a ride in any of the registered vehicles from the departure point to the destination. The transmission portion is configured to transmit the proposal route to the user terminal. The controlling portion determines the proposal route by comparing, with each other, a plurality of routes including a route in which the user changes at least two registered vehicles.

A program according to one aspect of the disclosure to achieve the above object is a program for displaying a proposal route including a route in which a user changes at least two vehicles. The program causes a controlling portion of a user terminal to execute: a process of receiving input of ride-sharing request information including a departure point, a destination, and at least either of a desired departure time and a desired arrival time; a process of transmitting the ride-sharing request information to a server; a process of acquiring, from the server, information on a proposal route including routes of vehicles for ride-sharing; and a process of displaying, on a display device, the information on the proposal route as sequential positions of the vehicles on a map.

A ride-sharing mediating method according to one aspect of the disclosure to achieve the above object is a ride-sharing mediating method including: a step of receiving, from registered vehicles, pieces of planned travel information including information on a planned travel route and a travel estimated time; a step of storing, in a storage portion, the pieces of planned travel information of the registered vehicles; a step of receiving, from a user terminal, ride-sharing request information including a departure point, a destination, and at least either of a desired departure time and a desired arrival time; a step of searching the pieces of planned travel information stored in the storage portion based on the ride-sharing request information and determining a proposal route including one or more routes in which the user shares a ride in any of the registered vehicles from the departure point to the destination, the proposal route being determined by comparing, with each other, a plurality of routes including a route in which the user changes at least two registered vehicles; and a step of transmitting the proposal route to the user terminal.

With the disclosure, it is possible to provide a ride-sharing mediating system, a server, a program, and a ride-sharing mediating method each for increasing usability of a ride-sharing service for a user without decreasing a convenience for a driver and a fellow occupant in a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
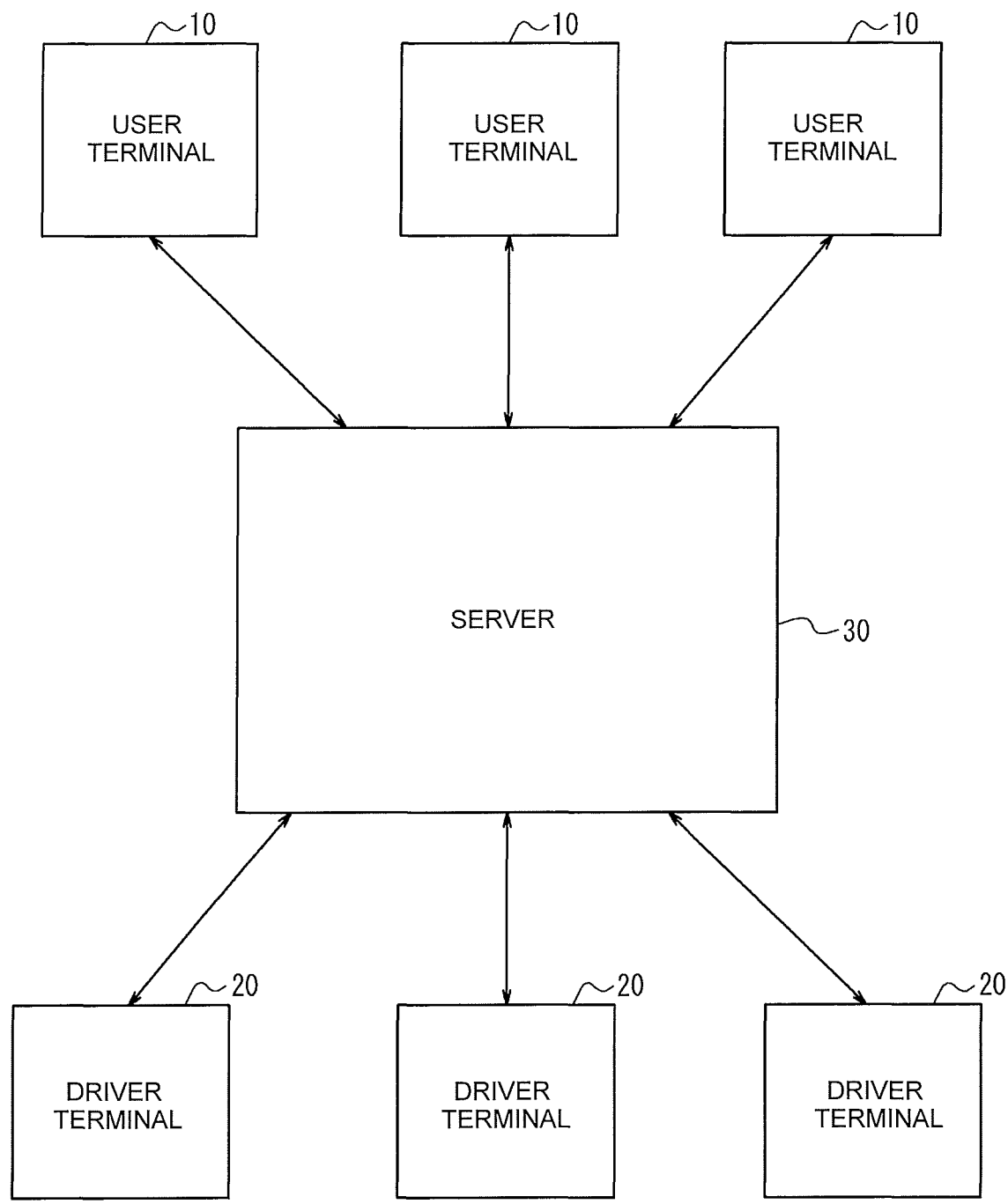
FIG. 1 is a block diagram illustrating a schematic configuration of a ride-sharing mediating system according to one embodiment of the disclosure.

One embodiment of this disclosure will be described below with reference to the drawings. Note that the drawings used in the following description are schematic. Dimension ratios or the like in the drawings do not necessarily accord with actual dimension ratios.

With reference to FIG. 1, the following describes an outline of a ride-sharing mediating system 1 according to one embodiment of the disclosure. The ride-sharing mediating system 1 includes a user terminal 10 of a user using a ride-sharing service, a plurality of driver terminals 20 configured such that drivers of a plurality of registered vehicles can browse and operate the driver terminals 20, respectively, and a server 30 configured to mediate the ride-sharing service. The user terminal 10 and the server 30 are communicable with each other via a communication line, and the driver terminal 20 and the server 30 are communicable with each other via a communication line.

User Terminal

Figure 2:
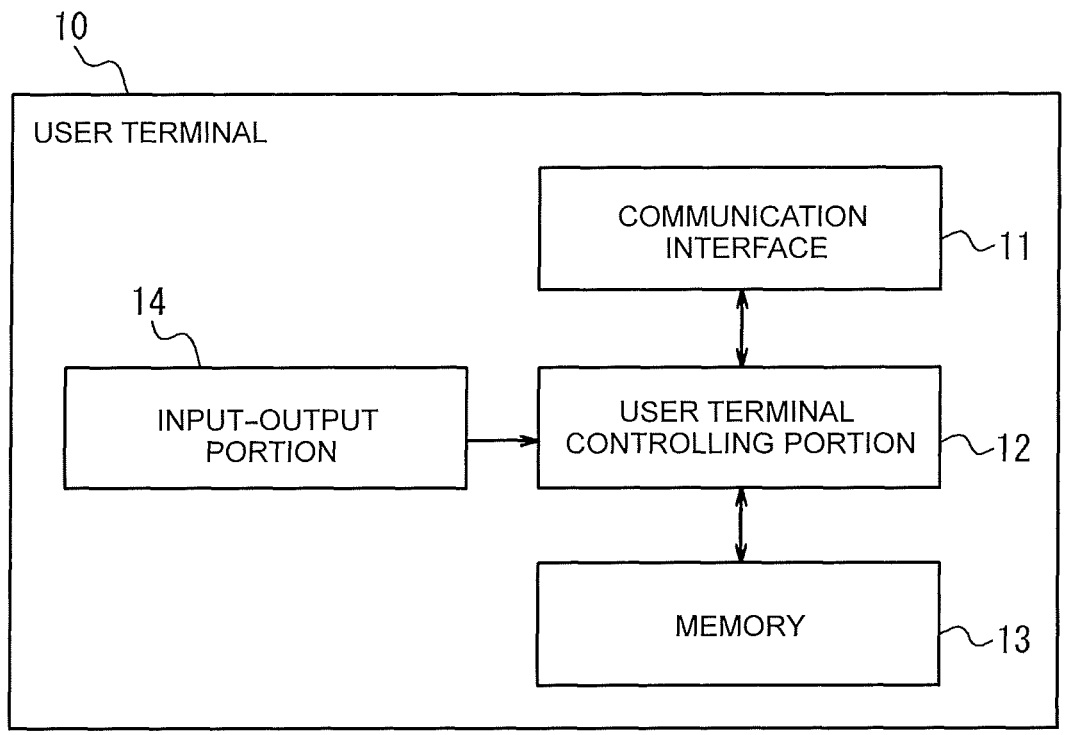
FIG. 2 is a block diagram illustrating a schematic configuration of a user terminal in FIG. 1.

The user terminal 10 can employ a general-purpose information terminal. The general-purpose information terminal includes a mobile phone (smartphone), a tablet terminal, a personal computer, and the like. In a case where the general-purpose information terminal is used, an application program for exclusive use of the ride-sharing mediating system 1 can be provided in the user terminal 10. An exclusive terminal may be used as the user terminal 10. As illustrated in FIG. 2, the user terminal 10 includes a communication interface 11, a user terminal controlling portion 12, a memory 13, and an input-output portion 14.

The communication interface 11 is an interface via which the user terminal 10 transmits and receives information to and from an external device including the server 30. The communication interface 11 includes a communication interface that can deal with wireless communication and wired communication. The user terminal controlling portion 12 controls the whole user terminal 10 and executes an application program. In the following description, it can be also said that the operation performed by the user terminal 10 is performed by the user terminal controlling portion 12. The user terminal controlling portion 12 includes one or more processors. In the memory 13, an application program and data are stored. The input-output portion 14 includes a display device on which information is displayed and an input device into which information is input. The user terminal 10 may include a touch panel as the input-output portion 14. The user terminal 10 may include a display, a mouse, a keyboard, and the like as the input-output portion 14.

In a case where a user wants to share a ride in a vehicle, the user terminal 10 receives input from the user and transmits ride-sharing request information to the server 30. The ride-sharing request information includes information on a desired departure point and a desired destination of the user. The information on the departure point and the destination can be input by various methods. For example, the user may specify a location on a map displayed on the input-output portion 14 by an application for the ride-sharing service. Further, the user may specify the departure point and the destination by an address or a phone number. The ride-sharing request information further includes information on both or either one of a desired departure time and a desired arrival time.

The ride-sharing request information may further include user information. The user information can be used to determine whether or not the user satisfies a ride-sharing condition set by a driver of a ride-sharing vehicle. The user information may include a name of the user or an ID registered in the ride-sharing mediating system 1 in advance. The user information may include information on age, sex, hometown, favorite music field, or the like of the user. These pieces of information may be registered in advance in association with the ID registered in the ride-sharing mediating system 1. The user information may include information on whether the user accompanies a pet or not, information on whether the user has large baggage or not, or the like.

The user terminal 10 can receive, from the server 30, information on a proposal route of a vehicle in which the user can share a ride, in terms of the ride-sharing request information transmitted to the server 30. The information on the proposal route includes a route of a ride-sharing vehicle, a getting-in time, and a getting-off time. The proposal route can include a route in which the user changes two or more vehicles. The user terminal 10 can display the proposal route on the input-output portion 14 and receive, from the user, input of a response including either an acceptance of or a refusal to the proposal route.

The user terminal 10 can display the proposal route on the input-output portion 14 by various methods. For example, the user terminal 10 may sequentially display a position of a vehicle that the user gets in on the map displayed on the input-output portion 14. Further, the user terminal 10 may be configured such that the input-output portion 14 is constituted by a touch panel that can detect a position of a finger of the user and a vehicle position is displayed on the input-output portion 14 by associating the position of the finger with a time. For example, the user can check a sequential change of the position of the vehicle that the user gets in by sliding the finger on the touch panel.

Driver Terminal

The driver terminal 20 is a terminal owned by a driver of a vehicle registered in the server 30 as a vehicle that accepts ride-sharing in the vehicle. Here, the vehicle mainly indicates a passenger car. The vehicle can include a vehicle for business use such as a taxi or a bus. The vehicle includes a vehicle in a form available in the future such as an autonomous driving vehicle. Further, in this disclosure, "driver" does not indicate a driver who is sitting on a driver seat of a vehicle but indicates a person who owns or occupies a vehicle used for the ride-sharing service. Accordingly, the driver can also use the driver terminal 20 in a location other than the vehicle.

Figure 3:
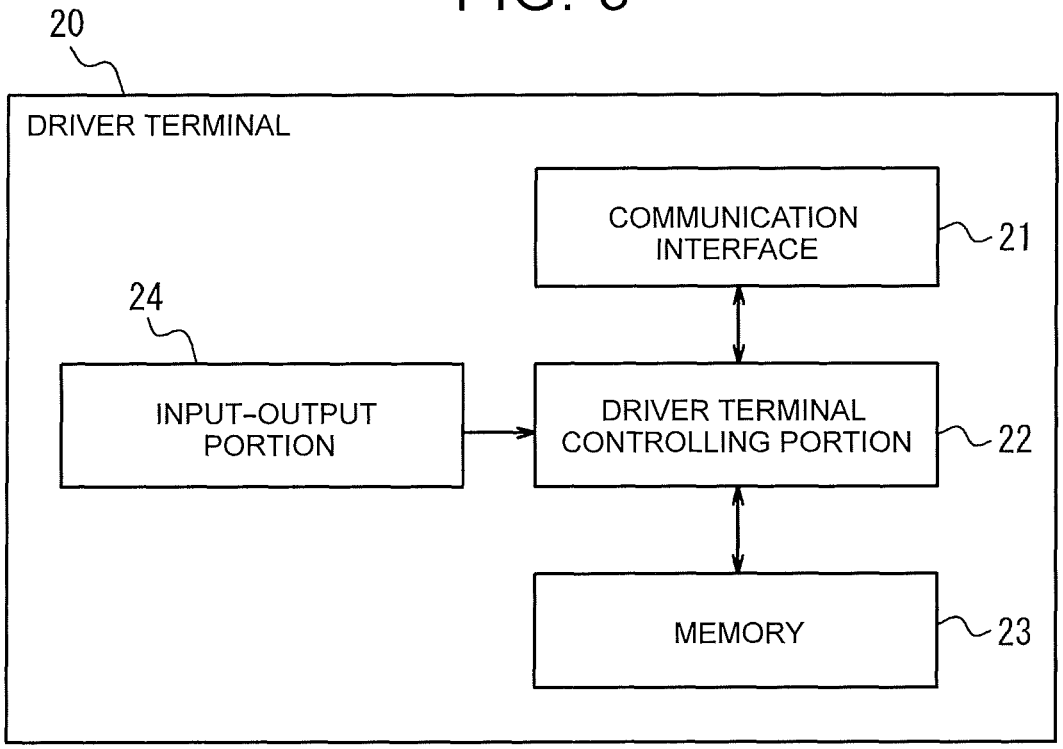
FIG. 3 is a block diagram illustrating a schematic configuration of a driver terminal in FIG. 1.

The driver terminal 20 can employ a general-purpose information terminal similar to the user terminal 10. The general-purpose information terminal includes a mobile phone (smartphone), a tablet terminal, a personal computer, and the like. In a case where the general-purpose information terminal is used, an application program for exclusive use of the ride-sharing mediating system 1 can be provided in the driver terminal 20. An exclusive terminal may be used as the driver terminal 20. In a case where the driver terminal is an exclusive terminal, the driver terminal 20 may be provided in a vehicle, for example. Alternatively, the driver terminal 20 may share hardware with other devices such as a navigation system. Further, the driver may use a plurality of driver terminals 20 linking with each other. For example, the driver may use both a mobile phone (smartphone) and an in-vehicle terminal as the driver terminals 20. As illustrated in FIG. 3, the driver terminal 20 includes a communication interface 21, a driver terminal controlling portion 22, a memory 23, and an input-output portion 24.

The communication interface 21 is an interface via which the driver terminal 20 transmits and receives information to and from an external device including the server 30. The communication interface 21 includes a communication interface that can deal with wireless communication and wired communication. The driver terminal controlling portion 22 controls the whole driver terminal 20 and executes an application program. In the following description, it can be also said that the operation performed by the driver terminal 20 is performed by the driver terminal controlling portion 22. The driver terminal controlling portion 22 includes one or more processors. In the memory 23, an application program and data are stored. The input-output portion 24 includes a display device on which information is displayed and an input device into which information is input. The driver terminal 20 may include a touch panel as the input-output portion 24. The driver terminal 20 may include a display, a mouse, a keyboard, and the like as the input-output portion 24.

The driver terminal 20 can receive, from the input-output portion 24, input of a ride-sharing condition that is a condition of a user who is permitted or not permitted to share a ride and can transmit it to the server 30 via the communication interface 21. The ride-sharing condition is, for example, only the same sex, no child, no pet, no food and drink in the vehicle, no large baggage, and the like. When the driver specifically sets a condition that permits or does not permit ride-sharing in the server 30 in advance, it is possible to reduce such a situation that the driver receives an unnecessary ride-sharing request from the server 30.

The driver terminal 20 can receive input of planned travel information including a planned travel route and a travel estimated time of a registered vehicle. The driver can input the information on the planned travel route and the travel estimated time from the input-output portion 24. The driver terminal 20 may acquire the information on the planned travel route and the travel estimated time from other applications in the driver terminal 20 into which the user inputs a travel plan. Further, the driver terminal 20 may acquire the planned travel information from other systems such as a navigation system in the vehicle via the communication interface 21. The driver terminal 20 transmits the planned travel information to the server 30 with information on the number of people who can ride together, and the like.

The driver terminal 20 can receive a ride-sharing request of the user from the server 30 via the communication interface 21. Information related to the ride-sharing request is referred to as ride-sharing request information. The ride-sharing request information is displayed on the input-output portion 24. The driver terminal 20 can receive input of an acceptance or a refusal of ride-sharing from the driver. The driver terminal 20 can transmit information on the acceptance or the refusal of ride-sharing to the server 30 via the communication interface 21.

Server

Figure 4:
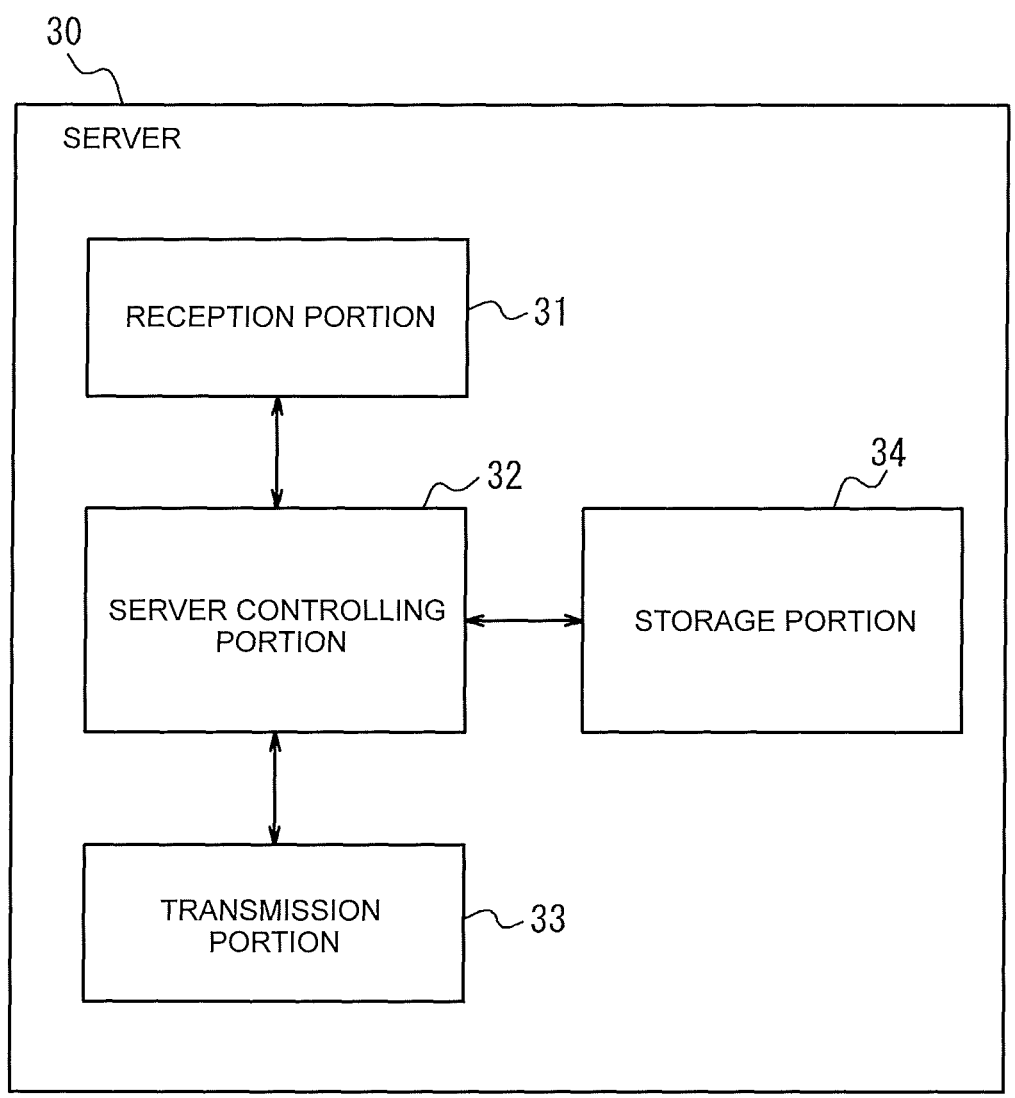
FIG. 4 is a block diagram illustrating a schematic configuration of a server in FIG. 1.

As illustrated in FIG. 4, the server 30 includes a reception portion 31, a server controlling portion 32 (controlling portion), a transmission portion 33, and a storage portion 34. The server 30 may be constituted by one information processor or may be constituted by a plurality of information processors linking with each other.

The reception portion 31 receives information from the user terminal 10 and the driver terminal 20. The transmission portion 33 transmits information to the user terminal 10 and the driver terminal 20. The reception portion 31 and the transmission portion 33 include a communicator corresponding to a communication network to be used. The reception portion 31 and the transmission portion 33 may include a communicator that can deal with wired communication and wireless communication. The reception portion 31 and the transmission portion 33 perform a protocol process related to reception and transmission of information and processes such as modulation of a transmitting signal and demodulation of a receiving signal.

The server controlling portion 32 includes a single or a plurality of processors and memories. The server controlling portion 32 controls an operation of the whole server 30. The processor includes a general purpose processor configured to execute a programmed function by reading a specific program and a special purpose processor specialized in a specific process. In the memory, a program to be executed by the processor, information being calculated by the processor, and the like can be stored. The memory and the processor are connected to each other by a bus line such as a data bus and a control bus.

The server controlling portion 32 stores, in the storage portion 34, pieces of information such as the user information, the ride-sharing condition, and the planned travel information that are input from the user terminal 10 and the driver terminal 20 and manages those pieces of information. The server controlling portion 32 can search the pieces of information stored in the storage portion 34. The server controlling portion 32 can update and delete the pieces of information stored in the storage portion 34.

When the server controlling portion 32 receives ride-sharing request information to request ride-sharing from the user terminal 10, the server controlling portion 32 searches pieces of planned travel information stored in the storage portion 34 and determines a proposal route including one or more routes where the user shares a ride in a registered vehicle from a departure point to a destination. The server controlling portion 32 determines the proposal route by comparing, with each other, a plurality of routes including a route where the user changes at least two registered vehicles.

In order to determine the proposal route, the server controlling portion 32 considers the user information received from the user terminal 10 and the ride-sharing condition received from the driver terminal 20 and stored in the storage portion 34. The server controlling portion 32 can exclude a vehicle the driver of which may refuse ride-sharing from the vehicles to be used for the ride-sharing service. This makes it possible to increase a possibility that the proposal route is accepted by a driver. In a case where the proposal route is a route where the user should change a plurality of vehicles, if any of drivers of the vehicles refuses ride-sharing, the whole proposal route is not established. In the ride-sharing mediating system 1 of the present embodiment, ride-sharing conditions are collected from the drivers in advance, and the proposal route is determined only by use of vehicles usable as ride-sharing vehicles. This makes it possible to reduce a possibility that ride-sharing is refused by a driver side.

The server controlling portion 32 transmits information on the proposal route to the user terminal 10 via the transmission portion 33 and receives a response of an acceptance or a refusal to the proposal route via the reception portion 31. The server controlling portion 32 can transmit ride-sharing request information to request ride-sharing to the driver terminal 20 via the transmission portion 33. The server controlling portion 32 can receive a response to the ride-sharing request from the driver terminal 20 via the reception portion 31. Further, the server controlling portion 32 can transmit information indicating that ride-sharing is confirmed to the user terminal 10 via the transmission portion 33.

The storage portion 34 includes a semiconductor storage, a magnetic storage, and an optical storage. The semiconductor storage includes a solid state drive (SSD) using a flash memory, and the like. The magnetic storage includes a magnetic tape, a floppy (registered trademark) disk, a hard disk, and the like, and a drive device thereof. The optical storage includes, for example, a compact disc (CD), a digital versatile disc (DVD), a Blu-ray (registered trademark), and the like, and a drive device thereof. The storage portion 34 may include a database managed by a database management system. The database includes a relational database (RDB), an object relational database (ORDB), a NoSQL database of a key value type, a column store type, or the like, and so on.

The storage portion 34 stores and manages: a ride-sharing condition and planned travel information for each driver of a registered vehicle, received from the driver terminal 20; user information, ride-sharing request information, and the like of the user who requests ride-sharing, received from user terminal 10; and so on. These pieces of information may be stored in and managed by the database. Further, in the storage portion 34, rating information, of the driver, that is collected from the user, rating information, of the user, that is collected from the driver, and the like may be stored. Those pieces of rating information are collected in such a manner that the server 30 urges the user and the driver to input the rating information after ride-sharing.

In the storage portion 34, a position of a candidate transit point suitable to change vehicles may be stored in advance. The point suitable to change vehicles includes a place where parking and stopping can be performed easily and the user can safely wait for a next vehicle in the case of transit. Further, in a case where the user has free time until the user gets in the next vehicle after the user gets off the vehicle before transit, the point suitable to change vehicles is preferably a place where the user can spend time appropriately. The candidate transit point includes, for example, a rotary of a station, a service area, a roadside restaurant, a parking space of a public facility, and the like. In a case where the candidate transit point is placed at a position where planned travel routes of at least two registered vehicles overlap with each other at the time of determining the proposal route, the server controlling portion 32 includes a route in which the user changes the registered vehicles in this candidate transit point in a plurality of routes to be compared with each other to determine the proposal route.

Examples of Proposal Route

Figure 5:
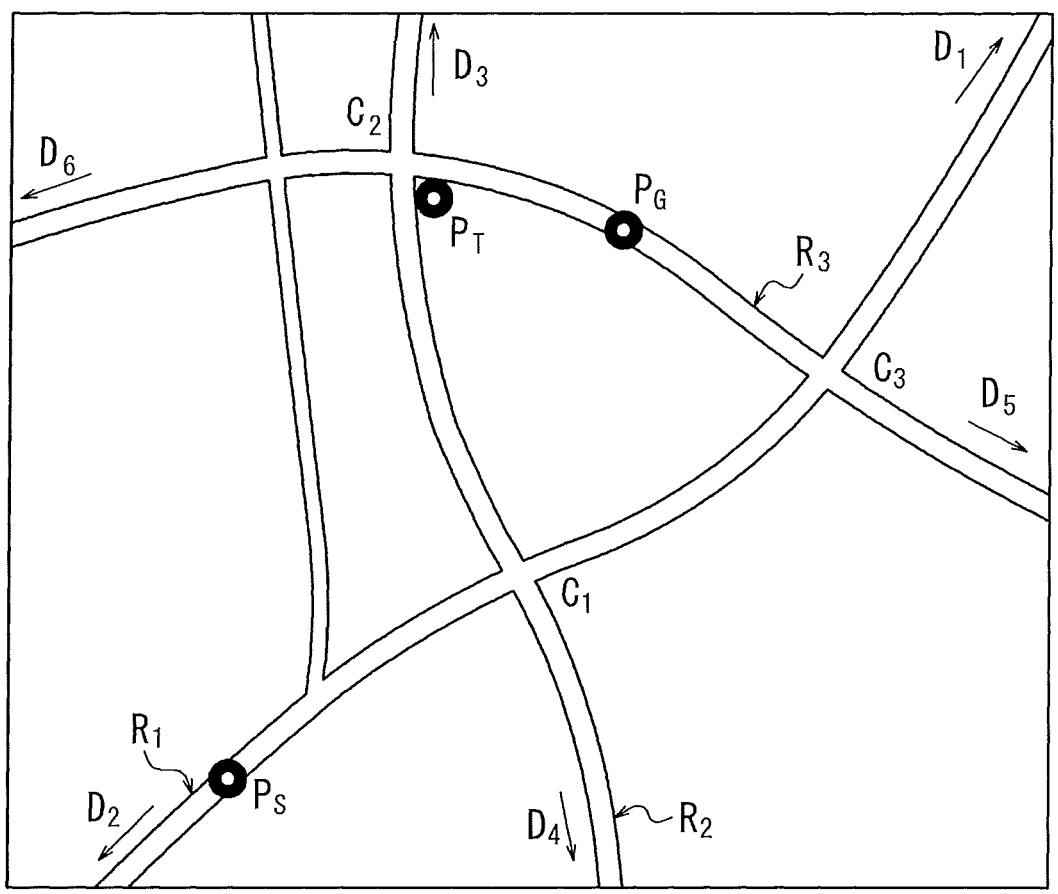
FIG. 5 is a view illustrating an example of a road map of a region where a search for a ride-sharing route is performed.

With reference to a road map in FIG. 5, the following will describe an example of the proposal route for ride-sharing in which the user changes two or more vehicles, the proposal route being proposed by the server 30. FIG. 5 is formed for the description. The ride-sharing mediating system 1 is not limited to this and can deal with various road arrangements.

In FIG. 5, it is assumed that the user moves by changing ride-sharing vehicles mediated by the ride-sharing mediating system 1 from a departure point $P_S$ to a destination $P_G$. A region including the departure point $P_S$ and the destination $P_G$ includes a first road $R_1$, a second road $R_2$, and a third road $R_3$. The departure point $P_S$ is placed on the first road $R_1$, and the destination $P_G$ is placed on the third road $R_3$. In FIG. 5, an extending direction of the first road $R_1$ includes a first direction $D_1$ and a second direction $D_2$ that is an opposite direction to the first direction $D_1$. Further, an extending direction of the second road $R_2$ includes a third direction $D_3$ and a fourth direction $D_4$ that is an opposite direction to the third direction $D_3$. An extending direction of the third road $R_3$ includes a fifth direction $D_5$ and a sixth direction $D_6$ that is an opposite direction to the fifth direction $D_5$. Further, an intersection between the first road $R_1$ and the second road $R_2$ is a first intersection $C_1$. An intersection between the second road $R_2$ and the third road $R_3$ is a second intersection $C_2$. An intersection between the first road $R_1$ and the third road $R_3$ is a third intersection $C_3$. Further, one transit point $P_T$ included in a plurality of candidate transit points stored in advance is placed in the vicinity of the second intersection $C_2$.

There might be no single vehicle passing through the departure point and the destination in a time range where the user is to move. For example, in an example of FIG. 5, in a time range where the user is to move from the departure point $P_S$ to the destination $P_G$, there might be no vehicle that passes through the departure point $P_S$, travels toward the first direction $D_1$ on the first road $R_1$, turns left at the third intersection $C_3$, travels toward the sixth direction $D_6$ on the third road $R_3$, and passes through the destination $P_G$. Further, there might be no vehicle that passes through the departure point $P_S$, travels toward the first direction $D_1$ on the first road $R_1$, turns left at the first intersection $C_1$, travels toward the third direction $D_3$ on the second road $R_2$, turns right at the second intersection $C_2$, travels toward the fifth direction $D_5$ on the third road $R_3$, and passes through the destination $P_G$. In such a case, in the ride-sharing mediating system in the related art, it is difficult to provide a ride-sharing service.

Figure 6:
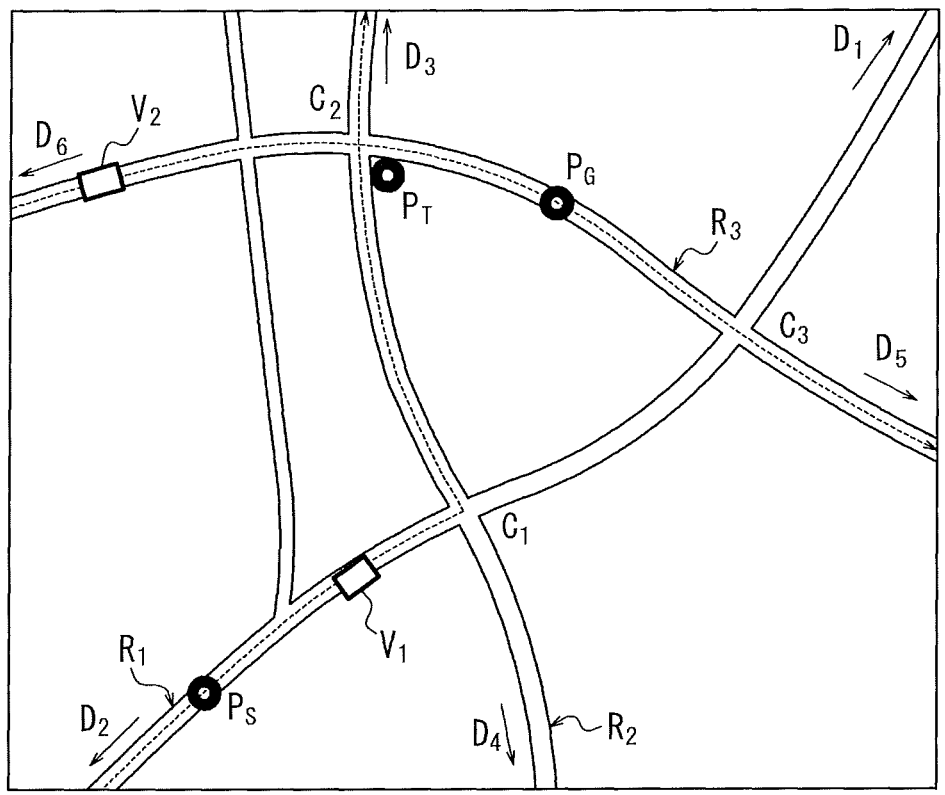
FIG. 6 is a view illustrating an example of a travel route of a registered vehicle traveling over the road map in FIG. 4.

Even in such a case, in the ride-sharing mediating system 1 of the present embodiment, the server controlling portion 32 of the server 30 can search pieces of planned travel information in the storage portion 34 for a proposal route in which the user changes two vehicles. For example, as illustrated in FIG. 6, it is assumed that there is a first vehicle $V_1$ that is planned to pass through the departure point $P_S$, travel toward the first direction $D_1$ on the first road $R_1$, turn left at the first intersection $C_1$, travel toward the third direction $D_3$ on the second road $R_2$, and go straight at the second intersection $C_2$. Further, it is assumed that there is a second vehicle $V_2$ that is planned to travel toward the fifth direction $D_5$ on the third road $R_3$ and pass through the second intersection $C_2$ and the destination $P_G$. If a time when the second vehicle $V_2$ passes through the transit point $P_T$ comes after a time when the first vehicle $V_1$ passes through the transit point $P_T$, the user can move from the departure point $P_S$ to the destination $P_G$ by changing from the first vehicle $V_1$ to the second vehicle $V_2$.

Figure 7:
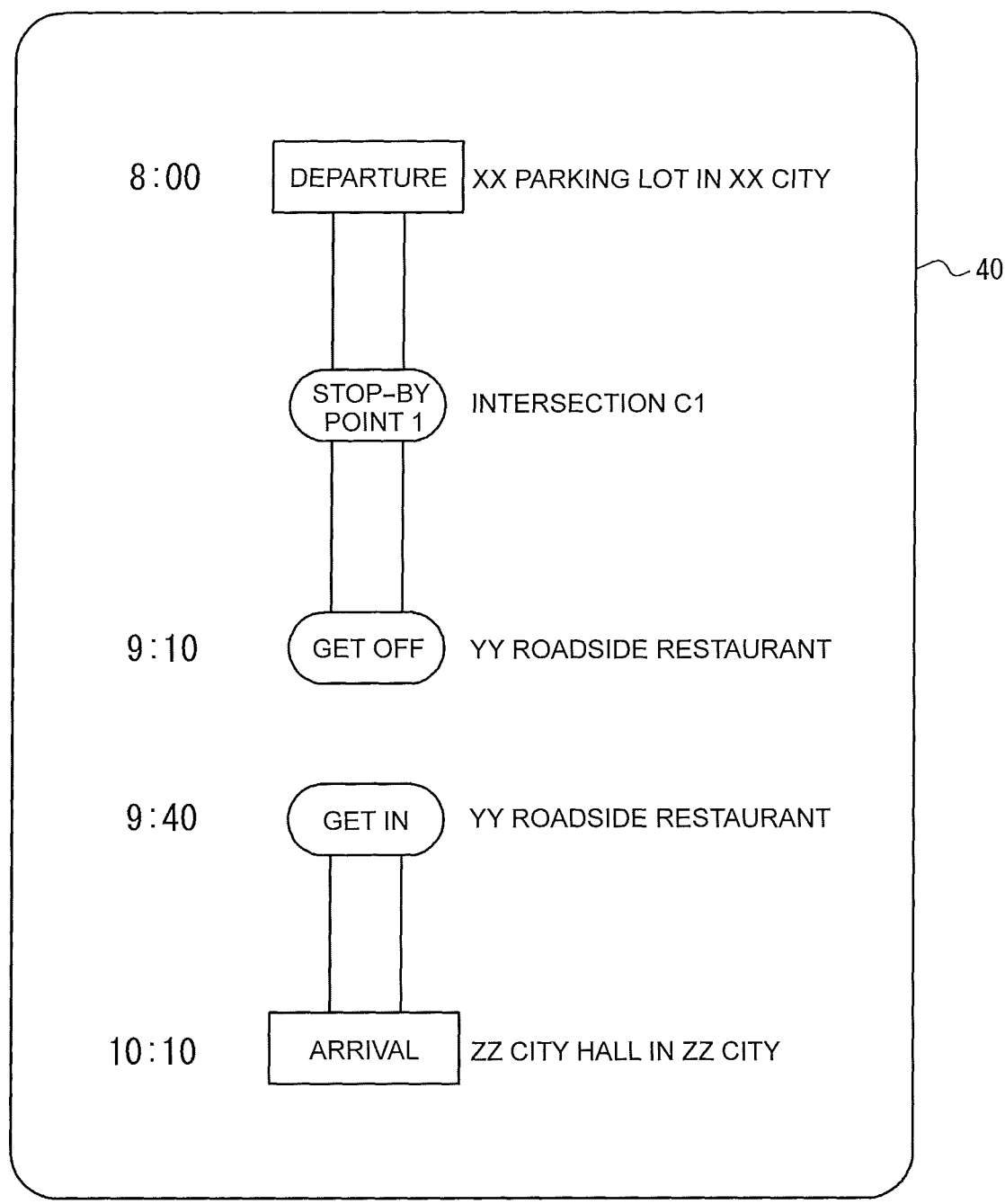
FIG. 7 is a view illustrating an example of a proposal route displayed on the user terminal.

The server controlling portion 32 of the server 30 can transmit, as a proposal route, a route to move from the departure point $P_S$ to the destination $P_G$ by changing from the first vehicle $V_1$ to the second vehicle $V_2$, to the user terminal 10 via the transmission portion 33. The input-output portion 14 of the user terminal 10 can display the proposal route to the user by displaying a screen as illustrated in FIG. 7, for example. Further, the user terminal 10 may display movements of the vehicles for ride-sharing in a time series manner as will be described below.

As such, by changing two vehicles, i.e., the first vehicle $V_1$ and the second vehicle $V_2$, the possibility that the user can use the ride-sharing service is increased. Further, it can be expected that the user can reach the destination $P_G$ at a time closer to a desired time than in a case where the user waits for a vehicle that passes through both the departure point $P_S$ and the destination $P_G$. Further, for example, in comparison with a case where the user asks the first vehicle $V_1$ to drop in at the destination $P_G$, it is not necessary that the first vehicle $V_1$ makes a detour, and thus, a convenience for a driver and a fellow occupant in the first vehicle $V_1$ does not decrease.

Ride-Sharing Mediating Process Flow

Figure 8:
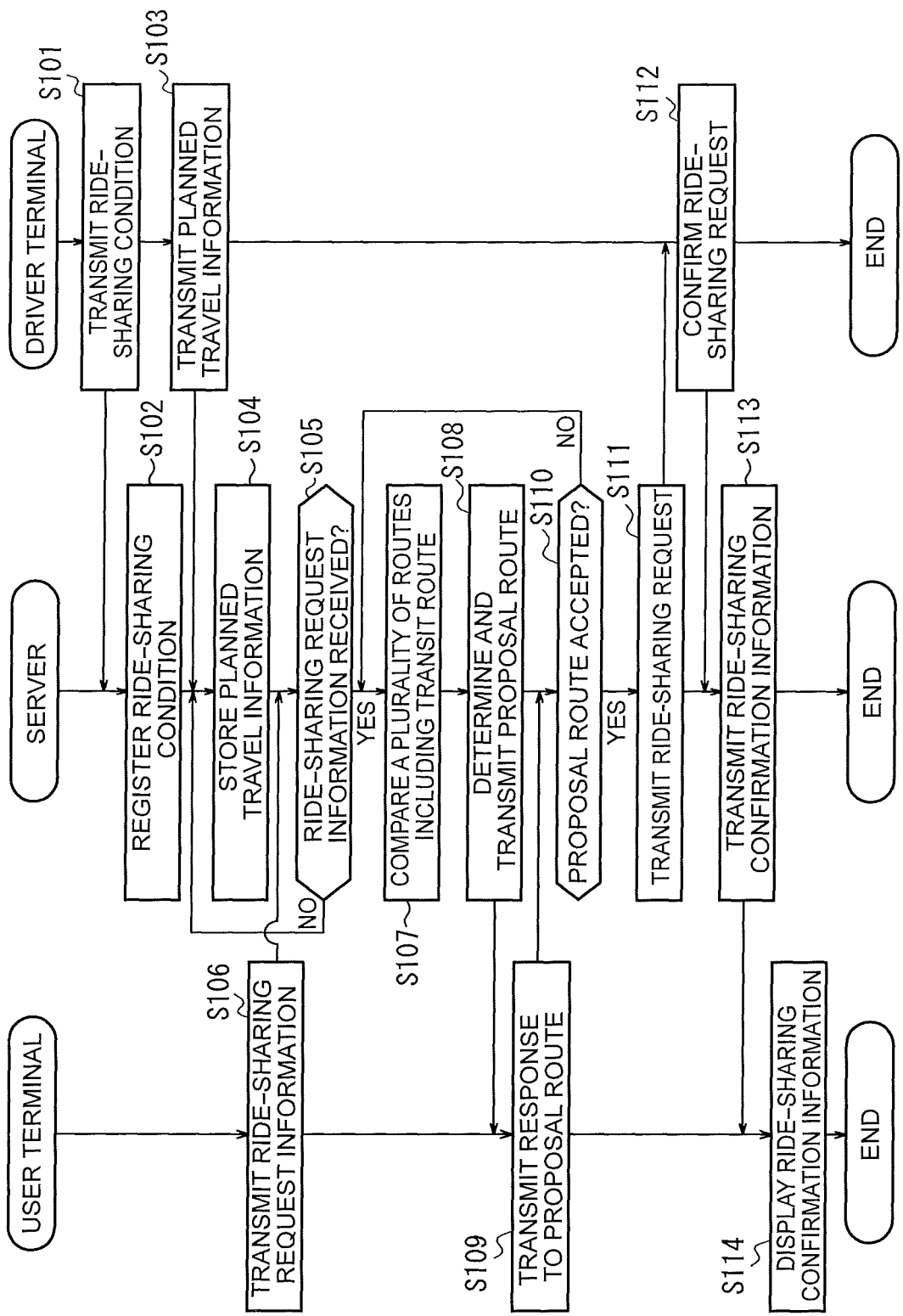
FIG. 8 is a view illustrating a workflow of a process performed by the ride-sharing mediating system.

With reference to a flowchart of FIG. 8, a process flow of the ride-sharing mediating system 1 will be described. Respective processes performed by the user terminal 10, the driver terminal 20, and the server 30, as illustrated in FIG. 8, can be executed by respective processors of the user terminal controlling portion 12, the driver terminal controlling portion 22, and the server controlling portion 32 in accordance with respective programs. The programs can be stored in a non-transitory computer readable medium. Examples of the non-transitory computer readable medium include a hard disk, a RAM, a ROM, a flash memory, a CD-ROM, an optical storage device, a magnetic storage device, and the like, but the non-transitory computer readable medium is not limited to them. The server controlling portion 32 executes a ride-sharing mediating method in accordance with the process flow of FIG. 8.

In a previous stage before ride-sharing is mediated, the driver terminal 20 receives input of a ride-sharing condition input from a driver of a registered vehicle and transmits the ride-sharing condition to the server 30 (step S101).

The server 30 stores the ride-sharing condition from each driver in the storage portion 34 per driver (step S102).

Then, when the driver is planned to use the vehicle and accepts ride-sharing, the driver terminal 20 transmits planned travel information to the server 30 (step S103). The planned travel information includes information on a planned travel route and a travel estimated time. The travel estimated time includes estimated times at which the vehicle passes through a plurality of positions on the travel route. As an example, the user terminal 10 may be provided with a program to form a travel plan or plan an itinerary. The user may form a travel plan on the user terminal 10 and the user terminal 10 may transmit planned travel information in accordance with the formed plan to the server 30.

The server 30 stores pieces of planned travel information of the vehicles in the storage portion 34 (step S104). In a normal state before the server 30 receives ride-sharing request information (step S105: No), the server 30 always updates the pieces of planned travel information in the storage portion 34 in accordance with planned travel information transmitted from the driver terminal 20.

When the user terminal 10 receives ride-sharing request information from the user, the user terminal 10 transmits the ride-sharing request information to the server 30 (step S106).

When the server 30 receives the ride-sharing request information from the user (step S105: Yes), the server 30 searches the pieces of planned travel information stored in the storage portion 34 for a plurality of routes passing through the departure point $P_S$ and the destination $P_G$, including transit routes, and the server 30 compares the routes thus found with each other (step S107).

The server 30 determines a proposal route to be proposed to the user based on a comparison result obtained by comparing the routes and transmits it to the user terminal 10 (step S108). There are various methods as a method for determining the proposal route. For example, a route that requires a shortest time from the departure point to the destination can be determined as the proposal route. As a result, the user can save time for movement. Alternatively, a route that requires a shortest travel distance from the departure point to the destination can be determined as the proposal route. As a result, the user can expect a reduction in payment to the ride-sharing service.

The user terminal 10 receives the proposal route from the server 30 (step S108). The user terminal 10 displays information in the form illustrated in FIG. 7 on the input-output portion 14. The user terminal 10 shows the information on the proposal route to the user by various methods, so that the user terminal 10 can support the user to make a determination on whether the user accepts or refuses the proposal route.

The user terminal 10 receives a response including an acceptance of or a refusal to the proposal route from the user and transmits the response to the proposal route to the server 30 (step S109).

In a case where the proposal route is not accepted (step S110: No), the server 30 returns to step S107 and repeats steps S107 to S110. Note that, in step S108, the server 30 may determine a plurality of candidate proposal routes and transmit them to the user terminal 10. In this case, the user terminal 10 may receive, from the user, one proposal route selected from the candidate proposal routes. With such a configuration, it is possible to reduce a possibility that the processes of steps S107 to S110 are repeated.

When the proposal route is accepted by the user (step S110: Yes), the server 30 transmits a ride-sharing request to the driver terminal 20 (step S111). The ride-sharing request includes a point where the user gets in the vehicle of the driver, a point where the user gets off the vehicle, and getting-in and getting-off estimated times.

The driver terminal 20 receives input of a ride-sharing confirmation from the driver, the ride-sharing confirmation including an acceptance of or a refusal to the ride-sharing request (step S112). When the server 30 is to show, to the driver terminal 20, only ride-sharing of a user satisfying the ride-sharing condition, it is expected that the driver basically accepts ride-sharing. In FIG. 8, in step S112, a procedure performed when the driver refuses ride-sharing is omitted. When the driver refuses ride-sharing, the process can return to the process of step S107. Note that the transmission of the ride-sharing request information (step S111) and the confirmation of the ride-sharing request information (step S112) may be performed after the ride-sharing route is determined in step S108 but before the transmission of the ride-sharing route to the user terminal 10.

When the server 30 receives, from the driver terminal 20, information indicative of the confirmation of the ride-sharing request information, the server 30 may transmit, to the user terminal 10, ride-sharing confirmation information indicating that ride-sharing is confirmed (step S113). The ride-sharing confirmation information includes confirmed information such as the departure point $P_S$, an estimated departure time, a getting-off time and a getting-in time at the transit point $P_T$, and an estimated arrival time at the destination $P_G$. Further, the ride-sharing confirmation information includes vehicle identification information to identify a vehicle for ride-sharing. The vehicle identification information may include information such as a vehicle type, a color, and a number of the vehicle for ride-sharing.

The user terminal 10 displays the ride-sharing confirmation information received from the server 30 on the input-output portion 14.

Display of Proposal Route on User Terminal

Next will be described an example of a method for displaying the proposal route on the user terminal 10, with reference to FIGS. 9 to 13. FIGS. 9 to 13 illustrate the proposal route in a time series manner in the form of a map. These are displayed on the user terminal 10 upon receipt of the proposal route transmitted from the server 30 in step S108 in the flowchart of FIG. 8.

FIGS. 9 to 13 illustrate a display content to be displayed on a touch panel 40 as one aspect of the input-output portion 14. The display on the touch panel 40 includes a route display map 41, a select button 42, a slide operating portion 43, and a time display portion 44.

The route display map 41 shows neighboring roads including an area from the departure point $P_S$ to the destination $P_G$. For description, in the route display map 41, the same constituent as that in the road map as FIG. 5 has the same reference sign as in FIG. 5.

The select button 42 is a button to select whether sequential display is performed automatically or manually. The select button 42 is configured such that either "manual" or "automatic" is selected by touching a button on the touch panel 40. When "automatic" is selected, the user can check automatic sequential movements of the first vehicle $V_1$ and the second vehicle $V_2$ for ride-sharing in a time series manner on the route display map 41. In the example illustrated herein, the first vehicle $V_1$ and the second vehicle $V_2$ are indicated by arrows. When "manual" is selected, prospective movements of the first vehicle $V_1$ and the second vehicle $V_2$ for ride-sharing are displayed by operating the slide operating portion 43 on the touch panel 40, as described below.

The slide operating portion 43 can slide a circular graphic element (hereinafter referred to as "button") along a frame indicative of a movable area in one direction, for example. When a finger is put on the touch panel 40 and the finger slides, the button slides in conjunction with a movement of the finger. A position of the button of the slide operating portion 43 corresponds to time. When "manual" is selected on the select button 42, the time changes in response to the position of the button, and prospective positions of the first vehicle $V_1$ and the second vehicle $V_2$ at a corresponding time are displayed on the route display map 41. When "automatic" is selected on the select button 42, the button of the slide operating portion 43 automatically moves along the change of the time.

The time display portion 44 displays a time corresponding to the display of the route display map 41.

Figure 9:
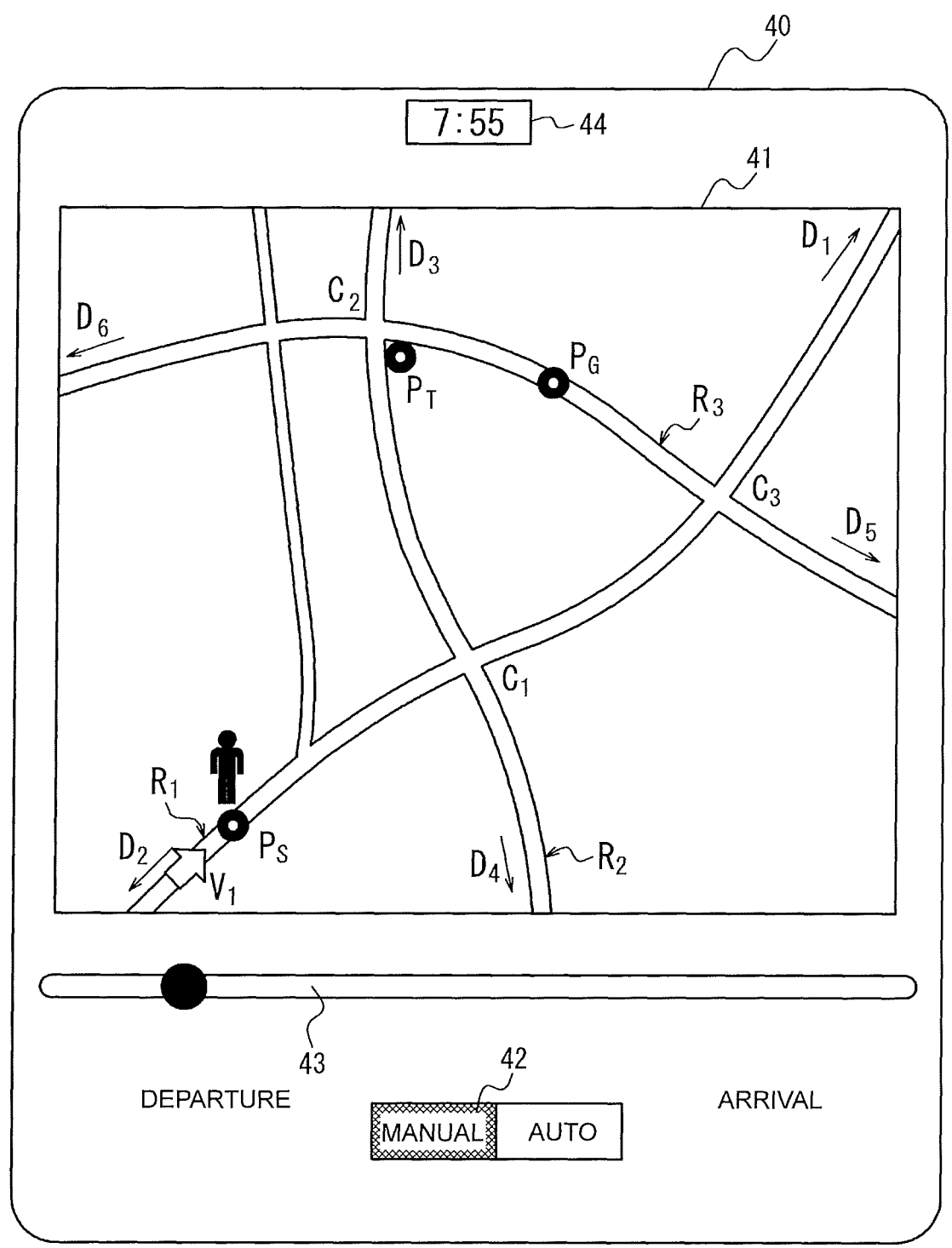
FIG. 9 is a view illustrating a vehicle position at a first time point on the proposal route displayed on the user terminal.

FIG. 9 illustrates a display content of the touch panel 40 corresponding to a first time (7:55) when "manual" is selected on the select button 42. On the route display map 41, the first vehicle $V_1$ has not arrived at the departure point $P_S$. The user who has not got in the first vehicle $V_1$ yet is indicated by a human-shaped icon at the departure point $P_S$.

Figure 10:
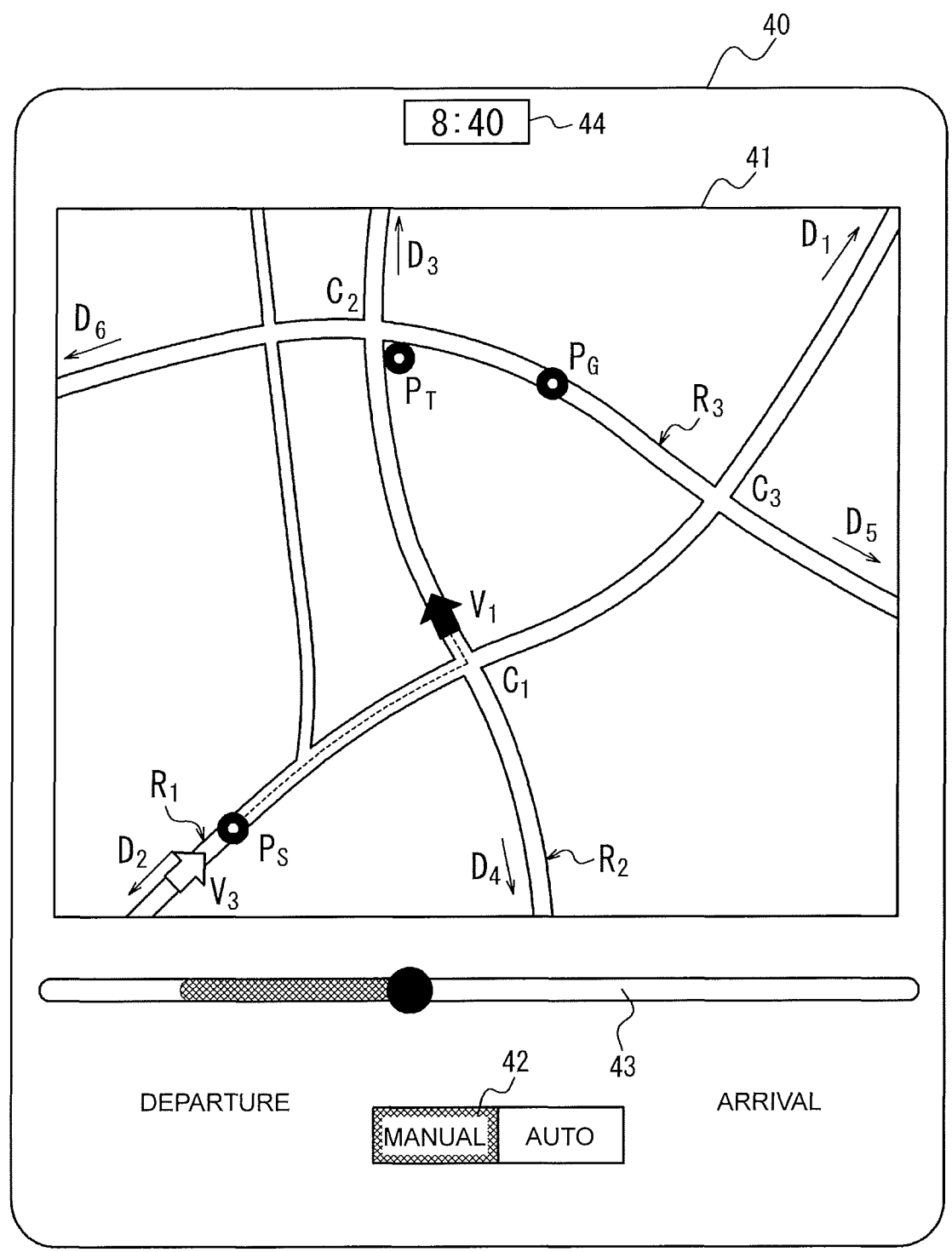
FIG. 10 is a view illustrating a vehicle position at a second time point on the proposal route displayed on the user terminal.

FIG. 10 illustrates a display content of the touch panel 40 corresponding to a second time (8:40) when "manual" is selected on the select button 42. On the route display map 41, the first vehicle $V_1$ that has picked up the user and turned left at the first intersection $C_1$ is placed on the second road $R_2$. The first vehicle $V_1$ taken by the user is displayed in a form different from that before the user gets in the first vehicle $V_1$. For example, the first vehicle $V_1$ taken by the user is displayed in a color different from that before the user gets in the first vehicle $V_1$. A locus (shown in a broken line in FIG. 10) of a route that the first vehicle $V_1$ has already passed through can be displayed as necessary. Note that, in FIG. 10, a third vehicle $V_3$ included in another candidate proposal route may be displayed.

Figure 11:
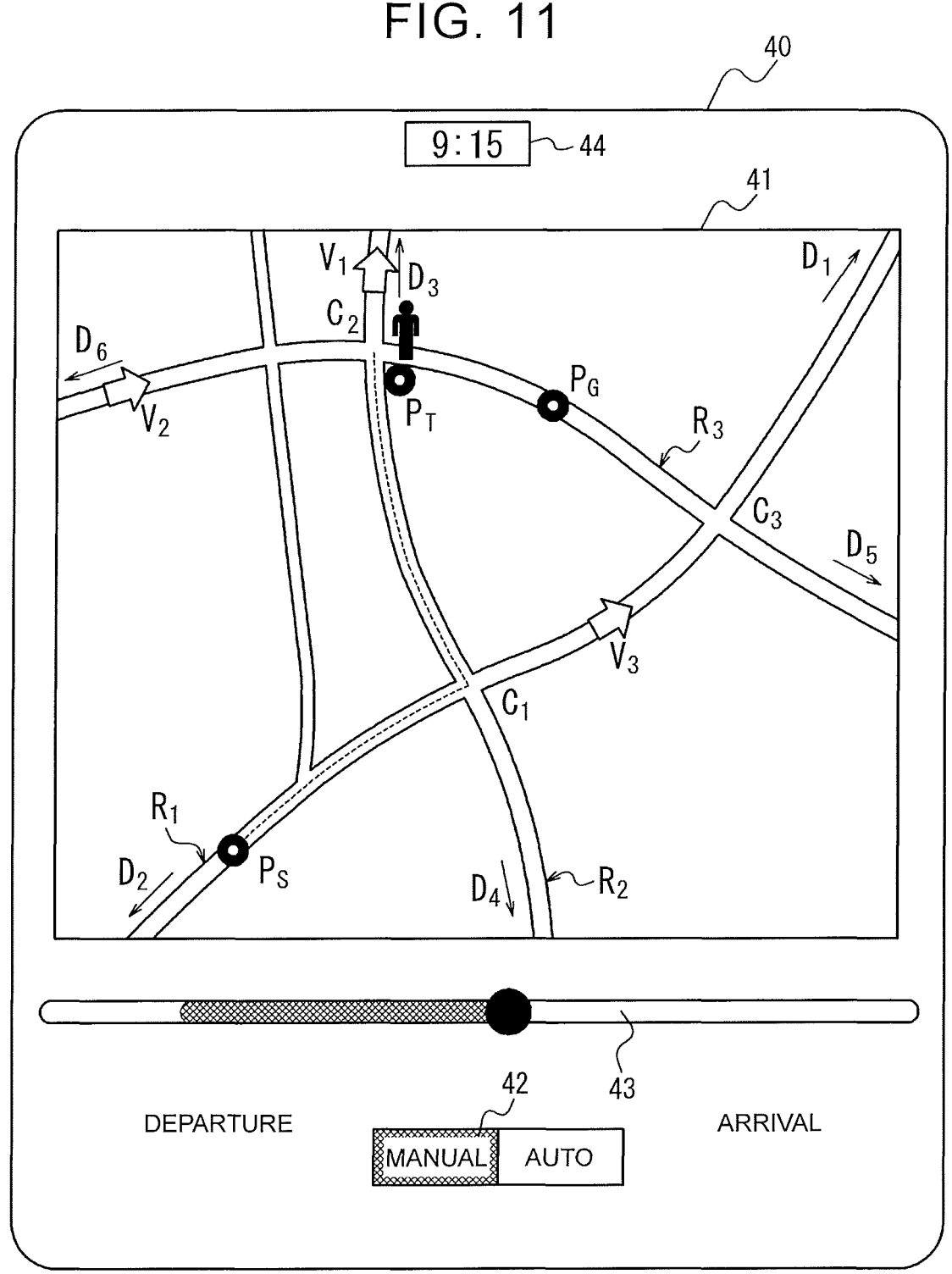
FIG. 11 is a view illustrating a vehicle position at a third time point on the proposal route displayed on the user terminal.

FIG. 11 illustrates a display content of the touch panel 40 corresponding to a third time (9:15) when "manual" is selected on the select button 42. On the route display map 41, the user has got off the first vehicle $V_1$ at the transit point $P_T$. A state where the user is placed at the transit point $P_T$ is indicated by a human-shaped icon. In the meantime, the second vehicle $V_2$ as a transit target that moves in the fifth direction $D_5$ toward the transit point $P_T$ is displayed on the third road $R_3$ in the sixth direction $D_6$.

Figure 12:
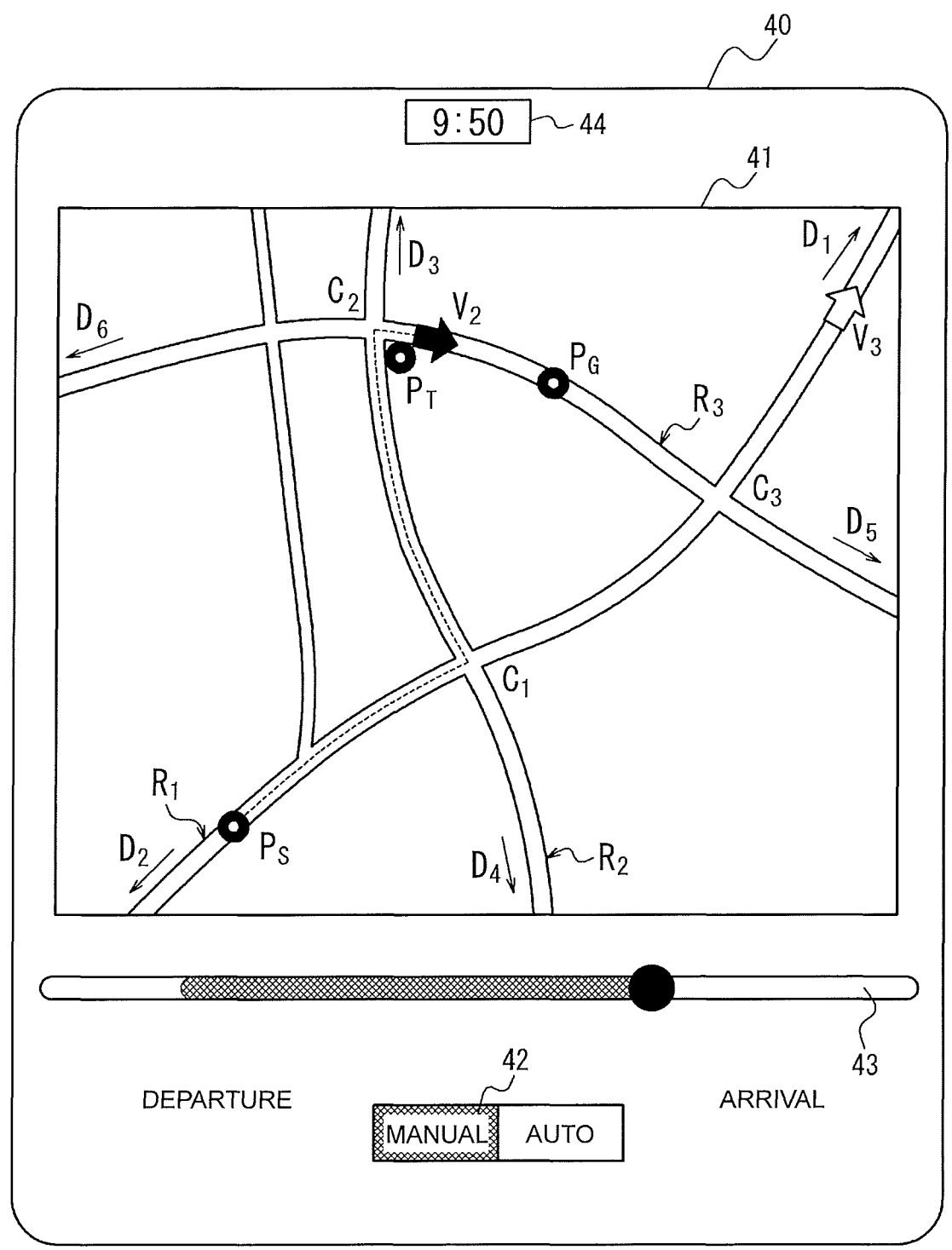
FIG. 12 is a view illustrating a vehicle position at a fourth time point on the proposal route displayed on the user terminal.

FIG. 12 illustrates a display content of the touch panel 40 corresponding to a fourth time (9:50) when "manual" is selected on the select button 42. On the route display map 41, the user gets in the second vehicle $V_2$ at the transit point $P_T$. Since the user has got in the second vehicle $V_2$, the human-shaped icon disappears, and a display mode of the second vehicle $V_2$ has changed.

Figure 13:
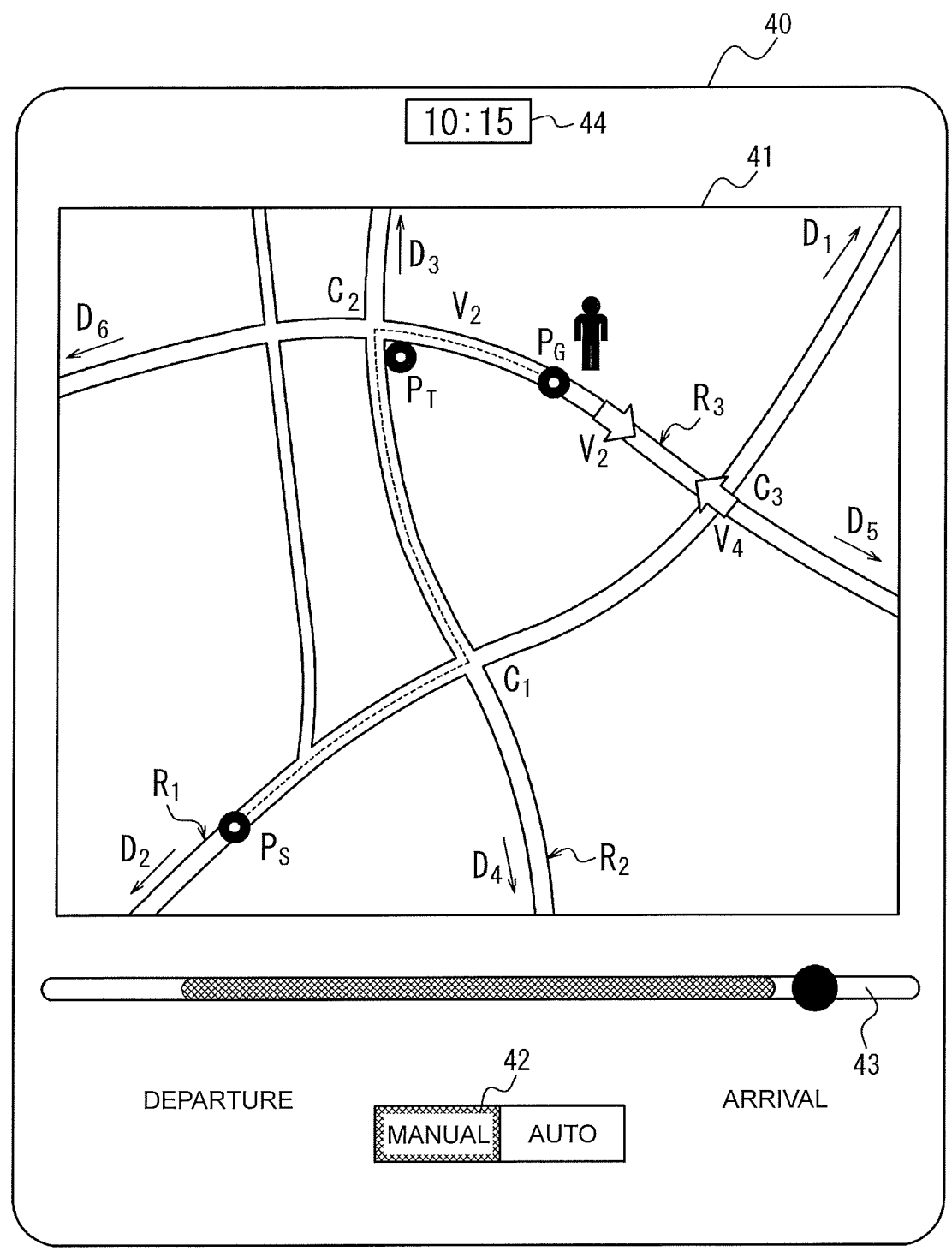
FIG. 13 is a view illustrating a vehicle position at a fifth time point on the proposal route displayed on the user terminal.

FIG. 13 illustrates a display content of the touch panel 40 corresponding to a fifth time (10:15) when "manual" is selected on the select button 42. The second vehicle $V_2$ has already passed through the destination $P_G$. A human-shaped icon indicating that the user has arrived at the destination $P_G$ is displayed. A fourth vehicle $V_4$ used in another candidate proposal route is displayed.

As described above, the user terminal 10 can clearly and simply show a movement course from the departure point $P_S$ to the destination $P_G$ to the user. Hereby, the user can easily grasp a situation in a case where the user actually moves along the proposal route. Further, the user can easily compare a plurality of proposal routes. Hereby, the user can easily make a response to the proposal route received from the server 30.

As described above, with the ride-sharing mediating system 1 of the present embodiment, the user can move from the departure point to the destination by changing a plurality of ride-sharing vehicles, thereby increasing the possibility that the user can use the ride-sharing service. Further, the user can expect that the time required from the departure point $P_S$ to the destination $P_G$ is shortened and/or an arrival time to the destination $P_G$ is made early. Further, for the driver who provides the ride-sharing service, a necessity that the driver should pick up the user and get the user off the vehicle at positions deviating from a planned route is reduced. Hereby, it is possible to achieve ride-sharing without decreasing a convenience for the driver and a fellow occupant.

Further, the user terminal 10 displays, on the touch panel 40, information on the proposal route as sequential vehicle positions on the route display map 41, so that the user can easily grasp the course of the proposal route. Hereby, the user can easily determine whether the user uses a proposed ride-sharing service or not.

Note that the disclosure is not limited to the above embodiment, and various modifications and changes can be made. For example, functions and the like included in the means, the steps, and the like can be rearranged within a range where the rearrangement is not logically inconsistent with the above embodiment. A plurality of means, steps, and the like may be combined into one or may be divided.

Figure 14:
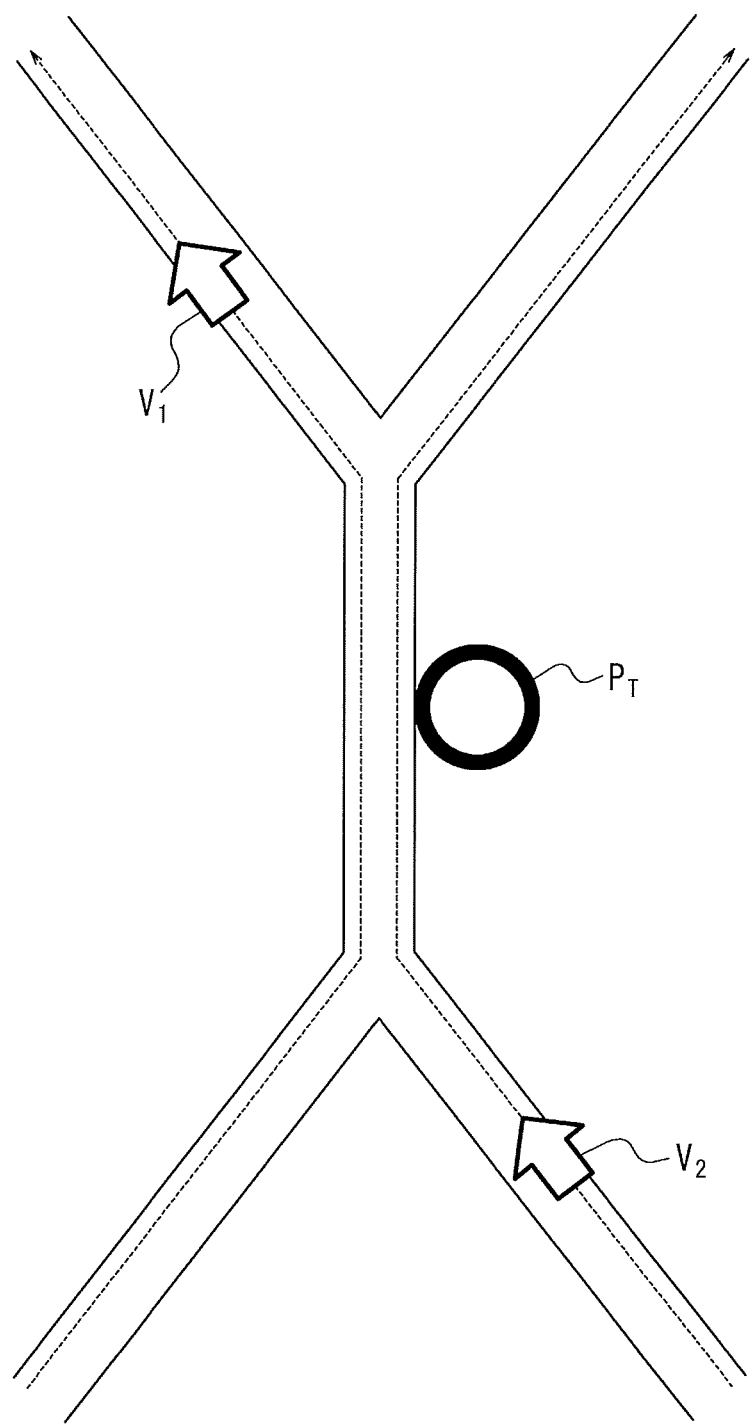
FIG. 14 is a view illustrating a travel route of a vehicle and a placement of a transit point in another example.

In the above embodiment, the transit point $P_T$ is placed at an intersection where two roads (the second road $R_2$ and the third road $R_3$) intersect with each other or in the vicinity to the intersection. However, the transit point $P_T$ is not limited to an intersection where roads intersect with each other or its vicinity and may be any point provided that travel routes of vehicles for ride-sharing overlap with each other. For example, as illustrated in FIG. 14, in a case where the first vehicle $V_1$ and the second vehicle $V_2$ for ride-sharing travel on the same road in a given region, the transit point $P_T$ can be set to any place near the road where the two vehicles both travel. Further, a getting-off position and a getting-in position at the time when the user changes ride-sharing vehicles may be placed at positions distanced from each other by a walking distance. In this case, the user gets off a first vehicle at a first transit point, then moves to a second transit point on foot, and gets in a second vehicle at the second transit point.

Further, in the above embodiment, the number of transit times is one. However, the server may propose, as a proposal route, a route in which the user changes vehicles multiple times.

The procedure of the process illustrated in the flowchart of FIG. 8 is only an example. Information may be exchanged between the user terminal and the server appropriately other than the flowchart of FIG. 8. For example, the user terminal may refer to the server in terms of information such as attribute information on sex, age, or the like of a driver of a ride-sharing vehicle of a proposal route received from the server and information of the transit point $P_T$. Further, information may be exchanged between the driver terminal and the server appropriately other than the flowchart of FIG. 8. For example, before the server determines the proposal route, the server may transmit attribute information of the user to the driver terminal so as to check whether the driver accepts ride-sharing or not.

What is claimed is:

1. A ride-sharing mediating system comprising:
    a driver terminal configured to receive, from registered vehicles, input of pieces of planned travel information including information on a planned travel route and a travel estimated time;
    a user terminal configured to receive input of ride-sharing request information including a departure point, a destination, and at least either of a desired departure time and a desired arrival time; and
    a server including at least one processor configured to:
        receive the planned travel information from the driver terminal,
        receive the ride-sharing request information from the user terminal,
        store the pieces of planned travel information of the registered vehicles,
        search the pieces of planned travel information based on the ride-sharing request information,
        determine a proposal route including one or more routes in which a user shares a ride in any of the registered vehicles from the departure point to the destination, and
        transmit the proposal route to the user terminal, wherein
    the at least one processor is configured to determine the proposal route by comparing, with each other, a plurality of routes including a route in which the user changes at least two registered vehicles, and
    a potential transfer point of the route in which the user changes the at least two registered vehicles is located at a location where planned travel routes of the at least two registered vehicles overlap with each other.

2. The ride-sharing mediating system according to claim 1, wherein the at least one processor is configured to determine the proposal route from the plurality of routes based on a time required from the departure point to the destination.

3. The ride-sharing mediating system according to claim 1, wherein the at least one processor is configured to determine the proposal route from the plurality of routes based on a travel distance from the departure point to the destination.

4. The ride-sharing mediating system according to claim 1, wherein:
    respective positions of a plurality of candidate transfer points are stored in advance; and
    when any of the candidate transfer points is placed at a position where the planned travel routes of the at least two registered vehicles overlap with each other, the at least one processor is configured to include a route in which the user changes the registered vehicles at the any of the candidate transfer points in the routes to be compared with each other to determine the proposal route.

5. The ride-sharing mediating system according to claim 1, wherein the potential transfer point of the route in which the user changes the at least two registered vehicles is located at a location different from a starting point and an ending point of each of the planned travel routes of the at least two registered vehicles.

6. The ride-sharing mediating system according to claim 1, wherein the at least two registered vehicles are both passenger cars.

7. The ride-sharing mediating system according to claim 1, wherein the at least two registered vehicles are both taxis.

8. The ride-sharing mediating system according to claim 1, wherein the at least two registered vehicles are both buses.

9. The ride-sharing mediating system according to claim 1, wherein the at least two registered vehicles includes at least two of a passenger car, a taxi, and a bus.

10. A server, comprising:
at least one processor configured to:
receive planned travel information from a driver terminal, the planned travel information including information on a planned travel route and a travel estimated time of a registered vehicle;
receive ride-sharing request information from a user terminal, the ride-sharing request information including a departure point and a destination of a user who requests ride-sharing and at least either of a desired departure time and a desired arrival time;
store pieces of planned travel information of registered vehicles;
search the pieces of planned travel information based on the ride-sharing request information;
determine a proposal route including one or more routes in which the user shares a ride in any of the registered vehicles from the departure point to the destination; and
transmit the proposal route to the user terminal, wherein
the at least one processor is configured to determine the proposal route by comparing, with each other, a plurality of routes including a route in which the user changes at least two registered vehicles, and
a potential transfer point of the route in which the user changes the at least two registered vehicles is located at a location where planned travel routes of the at least two registered vehicles overlap with each other.

11. The server according to claim 10, wherein the at least one processor is configured to determine the proposal route from the routes based on a time required from the departure point to the destination.

12. The server according to claim 10, wherein the at least one processor is configured to determine the proposal route from the routes based on a travel distance from the departure point to the destination.

13. The server according to claim 10, wherein:
positions of a plurality of candidate transfer points are stored in advance; and
when any of the candidate transfer points is placed at a position where the planned travel routes of the at least two registered vehicles overlap with each other, the at least one processor is configured to include a route in which the user changes the registered vehicles at the any of the candidate transfer points in the routes to be compared with each other to determine the proposal route.

14. A non-transitory computer readable medium storing a program for displaying a proposal route including a route in which a user changes at least two vehicles, the program causing at least one processor of a user terminal to execute:
receiving input of ride-sharing request information including a departure point, a destination, and at least either of a desired departure time and a desired arrival time;
transmitting the ride-sharing request information to a server;
acquiring, from the server, information on the proposal route including the route in which the user changes the at least two vehicles; and
displaying, on a display device, the information on the proposal route as sequential positions of the vehicles on a map,
wherein the information on the proposal route includes a transfer point in which the user changes the at least two vehicles located at a location where planned travel routes of the at least two vehicles overlap with each other.

15. The program according to claim 14, wherein:
the display device is a touch panel configured to detect a position of a finger of the user; and
the at least one processor is configured to execute displaying positions of the at least two vehicles on the display device by associating the position of the finger with a time.

16. A ride-sharing mediating method, comprising:
receiving, from registered vehicles, pieces of planned travel information including information on a planned travel route and a travel estimated time;
storing, in a storage portion, the pieces of planned travel information of the registered vehicles;
receiving, from a user terminal, ride-sharing request information including a departure point, a destination, and at least either of a desired departure time and a desired arrival time;
searching the pieces of planned travel information stored in the storage portion based on the ride-sharing request information;
determining a proposal route including one or more routes in which the user shares a ride in any of the registered vehicles from the departure point to the destination, the proposal route being determined by comparing, with each other, a plurality of routes including a route in which the user changes at least two registered vehicles; and
transmitting the proposal route to the user terminal,
wherein a potential transfer point of the route in which the user changes the at least two registered vehicles is located at a location where planned travel routes of the at least two registered vehicles overlap with each other.

* * * * *